US012703226B2

(12) United States Patent
Amini et al.

(10) Patent No.: US 12,703,226 B2
(45) Date of Patent: Aug. 11, 2026

(54) STOCHASTIC MODEL PREDICTIVE CONTROL FOR ELECTRIC VEHICLES THERMAL MANAGEMENT

(71) Applicant: The Regents of The University of Michigan, Ann Arbor, MI (US)

(72) Inventors: Mohammad Reza Amini, Ann Arbor, MI (US); Quihao Hu, Ann Arbor, MI (US); Ilya Kolmanovsky, Ann Arbor, MI (US); Jing Sun, Superior Township, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 140 days.

(21) Appl. No.: 18/897,247

(22) Filed: Sep. 26, 2024

(65) Prior Publication Data

US 2025/0108677 A1 Apr. 3, 2025

Related U.S. Application Data

(60) Provisional application No. 63/541,090, filed on Sep. 28, 2023.

(51) Int. Cl.
*B60H 1/00* (2006.01)

(52) U.S. Cl.
CPC ..... *B60H 1/00771* (2013.01); *B60H 1/00278* (2013.01)

(58) Field of Classification Search
CPC .......................... B60H 1/0071; B60H 1/00278
USPC .......................................................... 165/202
See application file for complete search history.

(56) References Cited

U.S. PATENT DOCUMENTS

| | | | | |
|---|---|---|---|---|
| 6,616,059 B2 * | 9/2003 | Sabhapathy | .......... | B60W 10/30 237/12.3 B |
| 10,369,898 B2 * | 8/2019 | Newman | ................. | B60L 58/26 |
| 10,814,881 B2 * | 10/2020 | Liu | ...................... | G06N 3/0499 |
| 11,214,114 B2 * | 1/2022 | Smith | .................... | B60H 1/143 |

(Continued)

OTHER PUBLICATIONS

Dan et al, Review of Thermal Management Technology for Electric Vehicles, Jun. 14, 2023.

*Primary Examiner* — Claire E Rojohn, III
(74) *Attorney, Agent, or Firm* — Harness, Dickey & Pierce, P.L.C.

(57) ABSTRACT

A stochastic Model Predictive Control approach is developed to efficiently optimize the thermal management of electric vehicles and accommodate scenarios with multiple routes. To account for the uncertainties, the cost function is constructed to minimize the expected cost across all possible routes over the prediction horizon. Thermal constraints are treated as soft constraints using slack variables. This approach allows for flexibility in satisfying the constraints while optimizing the performance. Through simulations, the performance of the proposed method is evaluated using a fleet of vehicles. In this way, the proposed method achieves a good trade-off between multiple competing performance metrics. Furthermore, an adaptation strategy is introduced, which dynamically adjusts the penalty weight value. This adaptive approach eliminates the need for offline calibration and further enhances performance. The results indicate that the time-varying penalty weight significantly reduces the total constraint violations by up to 20% without impacting the performance on energy consumption.

19 Claims, 9 Drawing Sheets

(56) References Cited

U.S. PATENT DOCUMENTS

| | | | | |
|---|---|---|---|---|
| 11,370,411 | B2 * | 6/2022 | Sakayanagi | B60K 6/445 |
| 11,610,480 | B2 * | 3/2023 | Clifford | G08G 1/0133 |
| 11,878,565 | B2 * | 1/2024 | Allgaeuer | B60H 1/00385 |
| 11,960,298 | B2 * | 4/2024 | Amini | B60W 60/00 |
| 12,002,357 | B2 * | 6/2024 | Clifford | G08G 1/096716 |
| 12,033,106 | B2 * | 7/2024 | Klingemann | G06Q 10/08 |
| 12,085,946 | B1 * | 9/2024 | Leung | G05D 1/0088 |
| 12,175,870 | B2 * | 12/2024 | Kellari | G08G 1/096716 |
| 12,219,445 | B2 * | 2/2025 | Li | H04W 4/44 |
| 12,299,074 | B2 * | 5/2025 | Clifford | G06F 18/2148 |
| 12,315,367 | B2 * | 5/2025 | Clifford | G08G 1/075 |
| 2005/0000473 | A1 * | 1/2005 | Ap | F01P 7/165<br>123/41.31 |
| 2008/0066699 | A1 * | 3/2008 | Michelini | F02D 13/0253<br>123/90.11 |
| 2009/0139781 | A1 * | 6/2009 | Straubel | B60L 53/14<br>701/22 |
| 2012/0297809 | A1 * | 11/2012 | Carpenter | B60H 1/143<br>62/239 |
| 2014/0244130 | A1 * | 8/2014 | Filev | B60K 31/00<br>701/96 |
| 2017/0316688 | A1 * | 11/2017 | Lai | G08G 1/0145 |
| 2018/0364725 | A1 * | 12/2018 | Lonari | B60W 30/188 |
| 2020/0131976 | A1 * | 4/2020 | Amini | B60H 1/00492 |
| 2021/0197692 | A1 * | 7/2021 | Hettrich | B60H 1/00278 |
| 2021/0318691 | A1 * | 10/2021 | Amini | G05D 1/0223 |
| 2025/0108677 | A1 * | 4/2025 | Amini | B60H 1/00278 |
| 2025/0346228 | A1 * | 11/2025 | Kavas Torris | B60W 30/143 |

* cited by examiner

Current Time

Route 1 ($P_1$)

Route 2 ($P_2$)

Vehicle Speed [m/s]

30 20 10 0

0 200 400 600 800

Time [ sec ]

Route 1

Route 2

Route 1

Power [ kW ]

100 50 0 -50

CV [ °C*sec ]

600

400

200

0.4

0/100 5/95 10/90 20/80 50/50 80/20 100/0

$p_1 / p_2$ [%]

STOCHASTIC MODEL PREDICTIVE CONTROL FOR ELECTRIC VEHICLES THERMAL MANAGEMENT

CROSS-REFERENCE TO RELATED APPLICATIONS

This application claims the benefit of U.S. Provisional Application No. 63/541,090, filed on Sep. 28, 2023. The entire disclosure of the above application is incorporated herein by reference.

FIELD

The present disclosure relates to thermal management for electric vehicles.

BACKGROUND

As electric vehicle (EV) technology continues to advance, efficient thermal management systems are essential for ensuring the reliability, performance, and longevity of key components, particularly the battery pack. Thermal management systems (TMS) impact the driving range, safety, and other important key performance attributes. Many existing publications have demonstrated that the driving range can be affected by thermal management. For instance, studies have shown that on a Nissan Leaf, thermal management consumes up to 9% and 22% energy on the New European driving cycle (NEDC) for cooling or heating, respectively. Therefore, reducing energy consumption associated with thermal management can significantly improve the overall EV system efficiency. Furthermore, thermal management strategies are essential for preventing thermal runaway or overheating, and extending the battery life cycle.

Many optimization-based approaches have been developed for the thermal management of EVs, including dynamic programming (DP), Pontryagin's maximum principle (PMP), and model predictive control (MPC). Among these approaches, model predictive control has the advantage of explicitly handling the state and input constraints and providing a near-optimal solution by minimizing a cost function over a receding horizon. This makes it particularly appealing for thermal management problems. However, there are several challenges in using model predictive control for thermal management in EVs. Firstly, the relatively slow dynamics of the thermal systems typically require model predictive control with a long horizon and significant computational effort. Secondly, the uncertainties in long-term forecasting of vehicle speed can degrade the performance. In previous works, the impact of specific types of uncertainties were investigated and a location-dependent constraint adjustment strategy was proposed to enhance robustness. However, a major assumption with this work is that the trip route is predetermined. In real-world applications, there are often multiple possible routes for a given destination. When a vehicle switches its route, significant changes can occur in vehicle speed, power, and thermal load. Therefore, leading to potential robustness issues. The primary contribution of this disclosure is preparing and demonstrating a control strategy for scenarios with multiple possible route options.

In this disclosure, a stochastic model predictive control framework is developed to effectively handle multiple route scenarios for thermal management. The primary objectives are to 1) minimize energy consumption within the thermal management system and 2) ensure favorable battery and cabin thermal conditions.

This section provides background information related to the present disclosure which is not necessarily prior art.

SUMMARY

This section provides a general summary of the disclosure, and is not a comprehensive disclosure of its full scope or all of its features.

A method is presented for controlling thermal management for electric vehicles powered in part by batteries. The method includes: defining a cost function indicative of energy consumption by a thermal management system of a vehicle, such that the energy consumption is a function of a route taken by the vehicle, wherein the cost function accounts for multiple routes that the vehicle can take and includes at least one input variable correlated to an input of the thermal management system; receiving a list of potential routes for the vehicle; calculating a thermal management cost for traversing the list of potential routes using the cost function, thereby determining a value for the at least one input variable; and controlling the thermal management system in accordance with the value for the at least one variable.

The cost function includes a first cost variable for energy consumption for thermal management of a passenger compartment of the vehicle, a second cost variable for energy consumption for cooling the batteries of the vehicle, an upper bound for temperature of the passenger compartment, and an upper bound for temperature of the batteries. The cost function further includes a first slack variable for the upper bound for temperature of the passenger compartment and a second slack variable for the upper bound for temperature of the batteries.

In an example embodiment, the thermal management cost is calculated by minimizing the cost function using dynamic programming In some embodiments, the penalty weights for slack variables in the cost function are adapted based on predicted constraint violations.

Controlling the thermal management system includes controlling an actuator in the thermal management system in accordance with the value for the at least one variable. The at least one input variable may be further defined as one of a split ratio of coolant between the battery control loop and the cabin cooling loop, or a flow rate for a pump in the refrigerant system. More specifically, a valve in a cooling subsystem is controlled, such that the valve controls the split of quantity of coolant flowing into a battery cooling loop and a cabin cooling loop.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
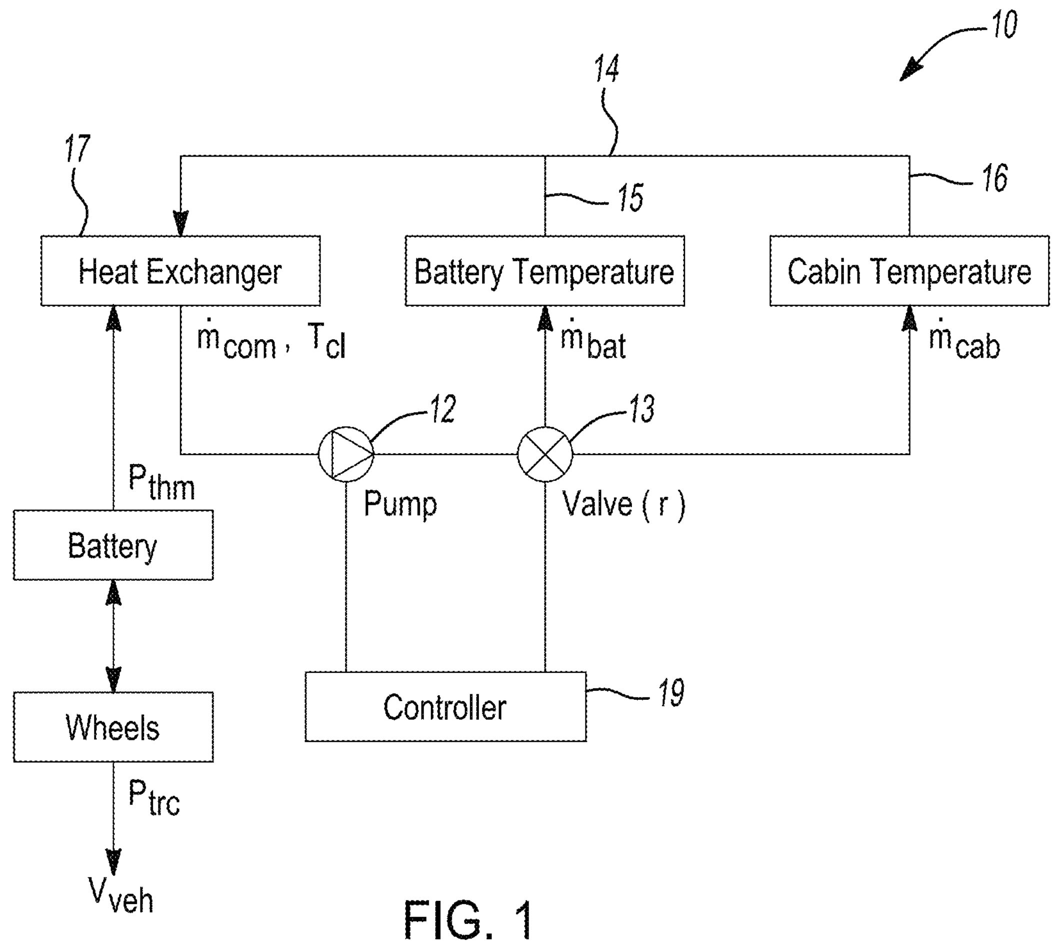
FIG. 1 is a schematic of an example thermal management system for an electric vehicle.

FIG. 1 illustrates the schematic of an integrated thermal management system 10 for an electric vehicle (EV). In an example embodiment, the thermal management system 10 is further defined as a refrigerant system. The refrigerant system 10 includes a pump 12, a valve 13, a refrigerant loop 14 and an external heat exchanger 17, where refrigerant loop is subdivided into a battery cooling loop 15 running adjacent to the battery and a cabin cooling loop 16 running through the cabin. The cabin and battery compartment each include heat exchangers for absorbing heat, while an external heat exchanger 17 dissipates the absorbed heat to the environment and provides cold coolant. It is understood that the lower-level controllers/actuators can maintain the coolant temperature effectively. Moreover, the outlet coolant temperature ($T_{cl}$) of the refrigerant system 10, controlled by an inner loop controller, is assumed to be constant. The electric pump 12 circulates the coolant, denoted by $\dot{m}_{com}$, through the loops. The three-way valve 13 splits the coolant into battery cooling loop 15 and cabin cooling loop 16, with mass flow rates of $\dot{m}_{bat}$ and $\dot{m}_{cab}$, respectively. The coolant flow rates adhere to the mass conservation law:

$$\dot{m}_{com} = \dot{m}_{bat} + \dot{m}_{Cab}, \tag{1}$$

$$\dot{m}_{cab} = r\dot{m}_{com}, \tag{2}$$

$$\dot{m}_{bat} = (1 - r)\dot{m}_{com}, \tag{3}$$

where r is the split ratio of the coolant. The cooling power required by the battery ($\dot{Q}_{bat}$) and by the cabin ($\dot{Q}_{cab}$) are determined by the following equations:

$$\dot{Q}_{bat} = \alpha(\dot{M}_{bat})(T_{bat} - T_{cl}), \tag{4}$$

$$\dot{Q}_{cab} = \beta(\dot{m}_{cab})(T_{cab} - T_{cl}), \tag{5}$$

where α and β are the heat exchange coefficients. Based on Newton's law, the heat exchange rate is proportional to the temperature difference between the cabin/battery and the coolant. Furthermore, the heat exchange coefficients increase proportionally to the coolant flow rate.

With continued reference to FIG. 1, the thermal management system 10 also includes a data store 18 for storing a cost function for an optimization problem and a controller 19 interfaced with at least one of the pump 12 and the valve 13. The controller 19 is configured to receive a list of potential routes for the vehicle with their probabilities and calculate a thermal management cost by minimizing the cost function as will be further described below. In an exemplary embodiment, the controller 19 is implemented as a microcontroller. It should be understood that the logic for the controller 19 can be implemented in hardware logic, software logic, or a combination of hardware and software logic. In this regard, controller 19 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller 19 performs a function or is configured to perform a function, it should be understood that controller 19 is configured to do so with appropriate logic (such as in software, logic devices, or a combination thereof).

As a starting point, the thermal and power subsystem of the electric vehicle need to be modeled. In this disclosure, the cabin is modeled as a lumped mass, and the cabin temperature dynamics are expressed as $$\dot{T}_{cab} = \frac{1}{m_{cab}C_{cab}}\left(\dot{Q}_{sun} + \dot{Q}_{ven} + \dot{Q}_{met} - \dot{Q}_{cab}\right), \tag{6}$$

where $m_{cab}$, $C_{cab}$ are the thermal mass and specific heat capacity of cabin, respectively. The terms $\dot{Q}_{sun}$, $\dot{Q}_{cov}$, and $\dot{Q}_{met}$ denote the heat transfer rates due to solar radiation, air convection, air ventilation, and human metabolic activities, respectively. While reference is made to this particular cabin model, it is readily understood that other types of models fall within the broader aspects of this disclosure.

Similarly, the battery is also modeled as lumped thermal mass, and its temperature dynamics can be expressed as:

$$\dot{T}_{bat} = \frac{1}{m_{bat}C_{bat}}\left(\dot{Q}_{gen} + \dot{Q}_{amb} - \dot{Q}_{bat}\right), \tag{7}$$

where $m_{bat}$ and $C_{bat}$ are the thermal mass and specific heat capacity of the battery, respectively. $\dot{Q}_{gen}$, $\dot{Q}_{amb}$, and $\dot{Q}_{bat}$ represent the heat rate generated by the battery's internal resistance, heat exchange rate to the ambient, and the cooling power provided by the TMS, respectively. Moreover, $\dot{Q}_{gen}$ can be expressed as $$\dot{Q}_{gen} = I_{bat}^2 R_{int}, \tag{8}$$

where $I_{bat}$ and $R_{int}$ are the battery current and battery internal resistance, respectively. In this study, the battery current is calculated using an equivalent circuit model:

$$I_{bat} = \frac{U_{oc} - \sqrt{U_{oc}^2 - 4R_{int}P_{bat}}}{2R_{int}}, \tag{9}$$

where $U_{oc}$ is the open-circuit voltage of the battery, and $P_{bat}$ is the total power demand from the battery, which includes the wheel traction power and the power used for the auxiliary system. While reference is made to this particular battery model, it is readily understood that other types of models fall within the broader aspects of this disclosure.

For vehicle power, the vehicle traction power ($P_{trc}$) is determined by $$P_{trc} = V_{veh}(\mathrm{m}\dot{V}_{veh} + F_r + F_a + F_g), \tag{10}$$

where $F_r$, $F_a$, and $F_g$ represent the rolling, aerodynamic resistance force, and the force caused by road grade, respectively, which are calculated as follows:

$$F_r = C_r \mathrm{mg}, \tag{11}$$

$$F_a = 0.5\rho A_f C_d V_{veh}^2, \tag{12}$$

$$F_g = \mathrm{mg}\cos(\theta), \tag{13}$$

where $C_r$ and $C_d$ are the coefficient of rolling and aerodynamic resistance, At is the frontal area of the vehicle, ρ is the air density, and θ is the road grade. Again, it is readily understood that other types of models fall within the broader aspects of this disclosure.

In this disclosure, consider a scenario where the future route of an electric vehicle is not predetermined. This means that there are multiple routes that the vehicle could potentially take because 1) the destination is unknown to thermal management system; or 2) there are multiple routes to choose from for the given destination. Given this uncertainty, the objective of the thermal management system is to minimize its energy consumption while adhering to power and thermal constraints. Consider N possible routes with assumed probability of $p_k$ associated with route k, a S-MPC formulation is proposed as follows:

$$\min_{\dot{m}_{com}(i), r(i)} \sum_{k=1}^{N} J_k p_k, \tag{14}$$

$$J_k = \sum_{i=t}^{t+H-1} \{(\dot{Q}_{cab,k}(i) + \dot{Q}_{bat,k}(i))\Delta t + a_1\epsilon_{1,k}^2 + a_2\epsilon_{2,k}^2 + b_1\Delta\dot{m}_{com}(i) + b_2\Delta r(i)\},$$

$$\text{s.t. } T_{bat,k}(i+1) = T_{bat,k}(i) + f_{bat,k}(i)\Delta t,$$

$$T_{cab,k}(i+1) = T_{cab,k}(i) + f_{cab,k}(i)\Delta t,$$

-continued $$\dot{Q}_{bat,k}(i) = \alpha(\dot{m}_{bat}(i))(T_{bat,k}(i) - T_{cl,out}),$$

$$\dot{Q}_{cab,k}(i) = \beta(\dot{m}_{cab}(i))(T_{cab,k}(i) - T_{cl,out}),$$

$$T_{cab,min} \le T_{cab,k}(i) \le T_{cab,max} + \epsilon_{1,k},$$

$$T_{bat,min} \le T_{bat,k}(i) \le T_{bat,max} + \epsilon_{2,k},$$

$$0 \le \dot{m}_{com}(i) \le \dot{m}_{max},$$

$$0 \le r(i) \le 1,$$

$$\Delta\dot{m}_{com,min} \le \Delta\dot{m}_{com}(i) \le \Delta\dot{m}_{com,max},$$

$$\Delta r_{min} \le \Delta r(i) \le \Delta r_{max},$$

where $f_{bat,k}$ and $f_{cab,k}$ are defined as $$f_{bat,k}(t) = \frac{1}{m_{bat}C_{bat}}(\dot{Q}_{gen,k} + \dot{Q}_{amb} - \dot{Q}_{bat,k}) \tag{15}$$

$$f_{cab,k}(t) = \frac{1}{m_{cab}C_{cab}}(\dot{Q}_{sun} + \dot{Q}_{cov} + \dot{Q}_{ven} + \dot{Q}_{met} - \dot{Q}_{cab,k})$$

and where $\dot{Q}_{gen,k}$ is internal heat generation over route k, which is determined by the traction power over route k, and calculated using (8) and (9). Moreover, At is the sampling time, and $T_p$=HΔt is the prediction horizon length.

The cost function in each route ($J_k$) consists of three terms: (i) the energy consumption for cabin ($\dot{Q}_{cab,k}$) and battery cooling ($\dot{Q}_{bat,k}$), (ii) penalty on slack variables, $\in_{1,k}$ and $\in_{2,k}$, which relax $T_{cab,k}$ and $T_{bat,k}$ upper bounds, and (iii) penalty terms for the rate of change of control variables, $m_{com}$ and r. The total cost function of MPC is the expectation of the cost over all possible routes.

Figure 2:
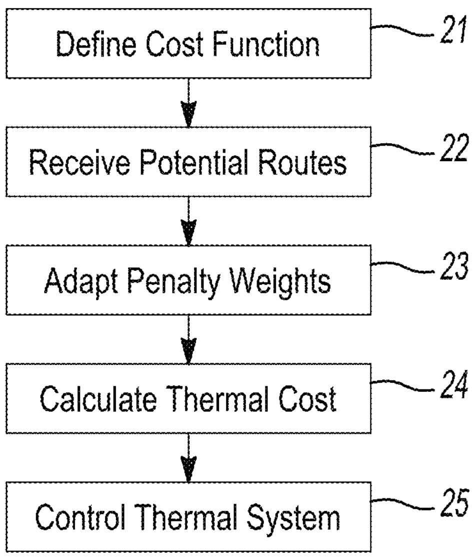
FIG. 2 is a flowchart illustrating a method for controlling thermal management for electric vehicles.

Given this framework, a method is presented for controlling thermal management for electric vehicles as seen in FIG. 2. As a starting point, a cost function indicative of energy consumption and thermal constraint violation is defined at 21 by a thermal management system of a vehicle, such that the energy consumption and constraint violation are functions of a route taken by the vehicle. As indicated above in (14), the cost function accounts for multiple routes that the vehicle can take and includes at least one input variable correlated to an input of the thermal management system. In the example embodiment, the input variables are defined as a split ratio (r) of coolant between the battery control loop and the cabin cooling loop, and a flow rate for a pump in the refrigerant system, $m_{com}$. The cost function further includes a first cost for energy consumption for thermal management of a passenger compartment of the vehicle, a second cost for energy consumption for cooling the batteries of the vehicle, an upper bound for temperature of the passenger compartment, and an upper bound for temperature of the batteries. The cost function also includes a first slack variable $\in_{1,k}$ for the upper bound for temperature of the passenger compartment and a second slack variable $\in_{2,k}$ for the upper bound for temperature of the batteries.

A list of potential routes for the vehicle also serves as an input to the control technique as indicated at 22. Each route is associated with a probability the vehicle will take the route. These probabilities may be determined in advance or in real time, for example based on historical traffic or driving data.

A thermal management cost for traversing the list of potential routes is then calculated at 24 using the cost function, thereby determining a value for the input variables.

In an example embodiment, the input variables are calculated by minimizing the cost function using dynamic programming although other optimization methods are contemplated by this disclosure.

Lastly, the thermal management system is controlled at 25 in accordance with the value for the input variables. For example, an actuator in the thermal management system is controlled in accordance with the value for an input variable. More specifically, valve 13 in a cooling subsystem is controlled in accordance with the split ratio, where the valve controls quantity of coolant flowing into a battery cooling loop 15 and a cabin cooling loop 16. Additionally or alternatively, the flow rate of pump 12 in the cooling subsystem is controlled in accordance with the flow rate.

In some embodiments, the penalty weights for slack variables in the cost function are adapted at 23 based on predicted constraint violations as will further described below. It is to be understood that only the relevant steps of the control scheme are discussed in relation to FIG. 2, but that other software-implemented instructions may be needed to control and manage the overall operation of the thermal management system.

Figure 3A:
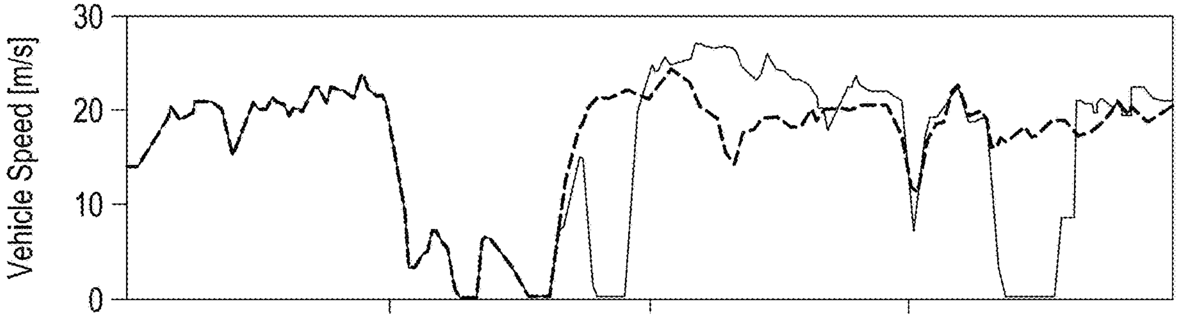
FIGS. 3A-3C are graphs showing sample vehicle speed profiles, road grade and traction power profiles, respectively, for two possible routes.
Figure 3B:
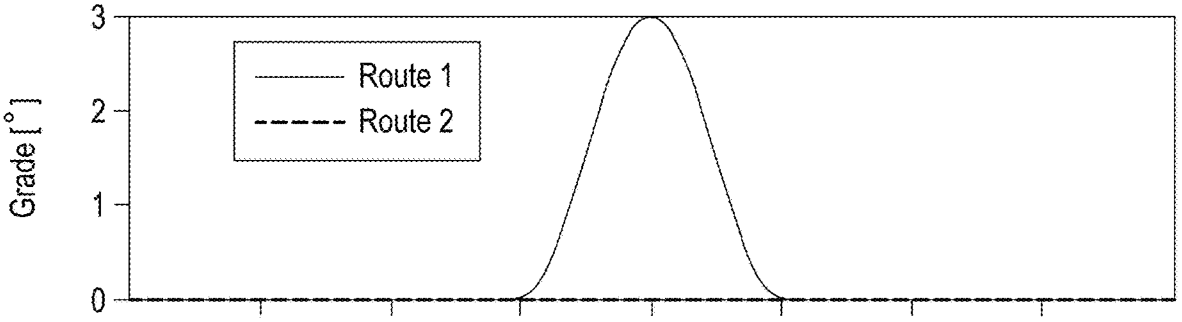
Figure 3C:
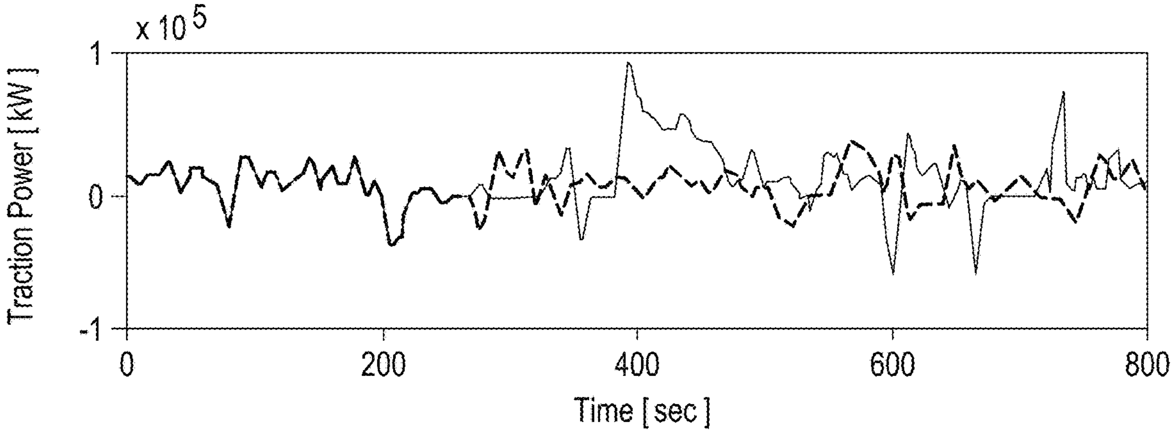
Figure 4A:
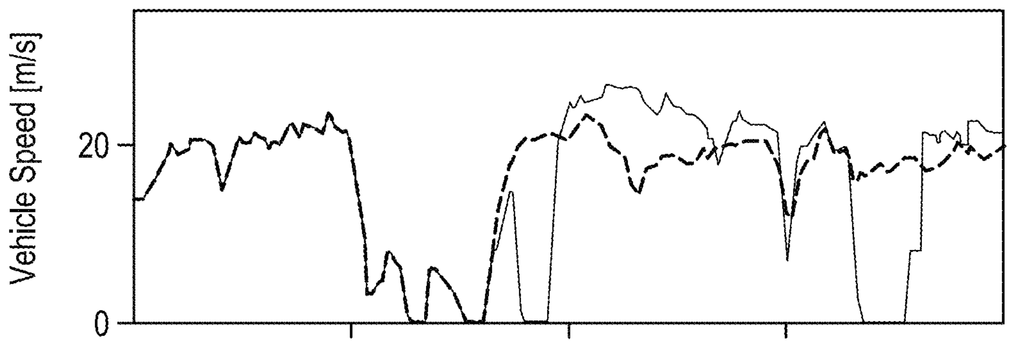
FIGS. 4A-4F are graphs showing deterministic model predictive control results for vehicle speed, traction power, cabin temperature, battery temperature, cabin cooling power and battery cooling power, respectively, for the sample scenarios in FIG. 3.
Figure 4B:
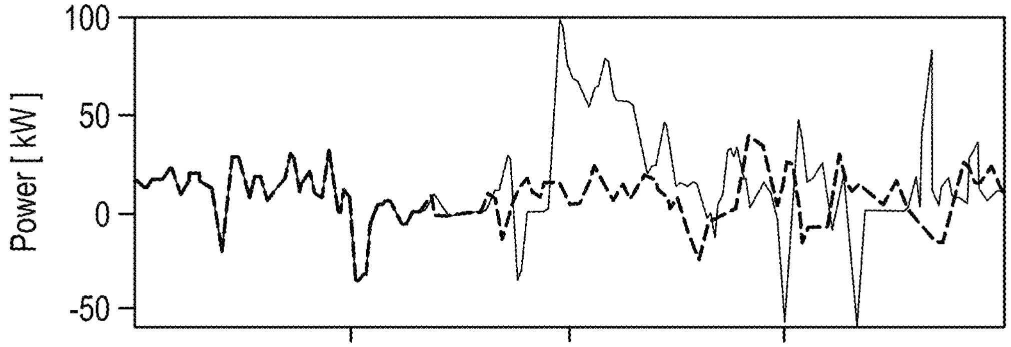
Figure 4C:
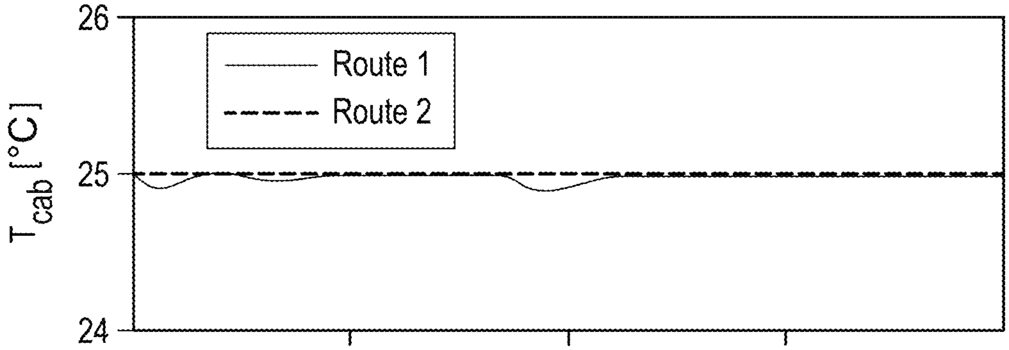
Figure 4D:
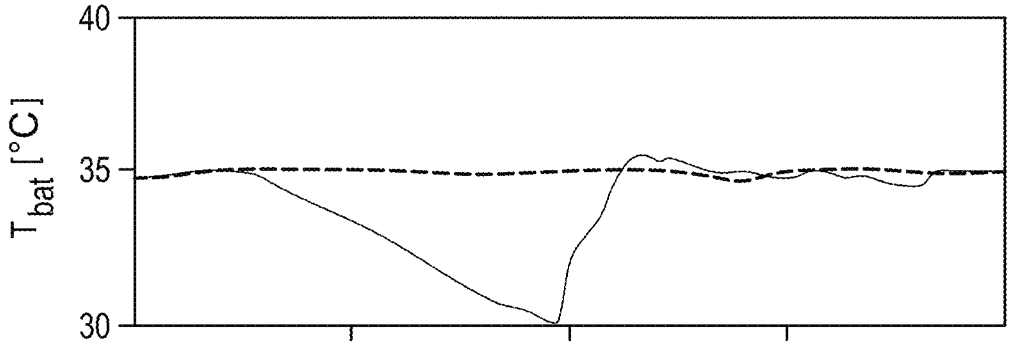
Figure 4E:
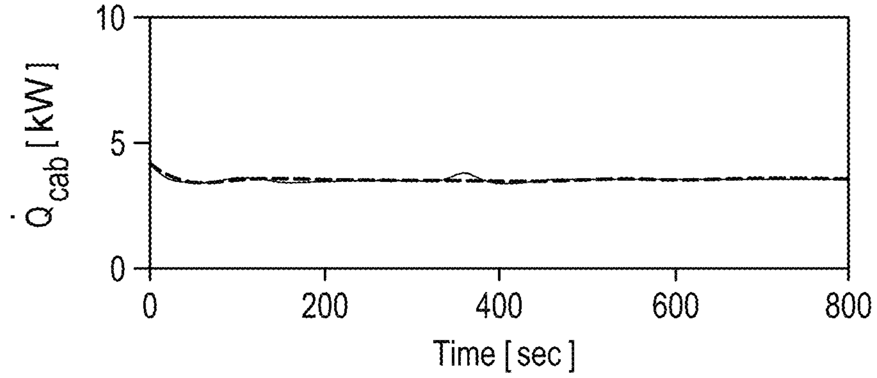
Figure 4F:
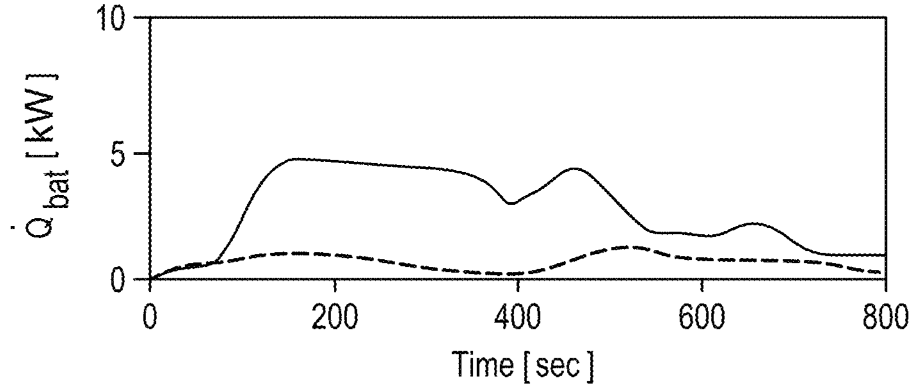

To demonstrate the effectiveness of the proposed S-MPC, consider a scenario that a commercial electric vehicle has two possible routes in the near future. FIGS. 3A-3C illustrate the vehicle speed profile, road grade, and traction power profile for both routes. Note that the traction power is calculated using equation (10). It can be seen from FIG. 3C that Route 1 exhibits significantly higher traction power compared to Route 2, particularly around 400 seconds. This is mainly caused by large road grades and accelerations over certain road segments.

As higher traction power necessitates greater battery power and current, the battery cooling demands of Route 1 are larger than that of Route 2. First assume that the future route of the vehicle can be correctly predicted. In this situation, the S-MPC approach becomes a conventional deterministic MPC. Also assume that the preview information, encompassing the vehicle speed profile and road grade, is available over the prediction horizon.

For a case study, consider the selection of the prediction horizon of 400 sec and the sampling time of 20 sec based on an earlier sensitivity analysis. The penalty weights $b_1$ and $b_2$ are set large enough ($b_1=b_2=5\times10^4$) to make sure there are no significant oscillations in $\dot{m}_{com}$ and r. The weights $a_1$ and $a_2$ are also set large enough ($a_1=1\times10^6$, and $a^2=1\times10^3$) to make sure the soft constraints are strict enough, and there is no significant constraint violation. The sensitivity of the solution to penalty weights will be discussed later.

Consider the ambient temperatures of 38° C. $T_{cab,min}$ and $T_{cab,max}$ in (14) are considered as 24° C. and 25° C., respectively. $T_{bat,min}$ and $T_{bat,max}$ are 15° C. and 35° C. FIGS. 4A-4F presents simulation results of the vehicles going through two different routes. It can be seen that when the vehicle goes to Route 1, because of the large traction power, the controller needs to conduct pre-cooling (t=100–400 sec) to avoid battery temperature constraint violation. This is because the generated heat rate of the battery is beyond the maximum cooling capacity of the thermal management system. In Route 2, as there is no significant large traction power, no pre-cooling needs to be conducted. To minimize the energy consumption of the thermal management system, the battery temperature follows the upper bound of the constraints ($T_{bat,max}$=35° C.). Thus, the solution can clearly be route-dependent.

Figure 5:
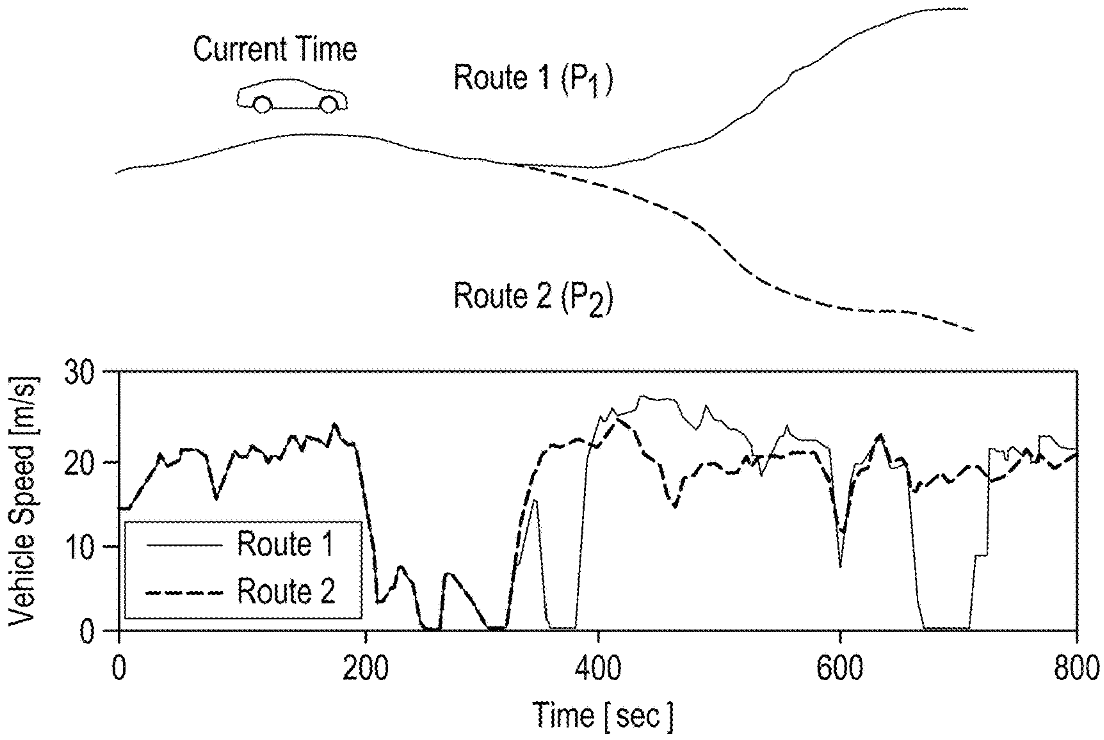
FIG. 5 illustrates an example scenario with two possible routes.

Next, the assumption that the future route of the vehicle is accurately predicted is relaxed. There could be multiple routes that the vehicle can potentially take. To better illustrate the concept, consider a simple scenario with only two possible routes shown in FIG. 5. It can be seen that Routes 1 and 2 overlap at the beginning of the trip and diverge after an intersection. The route information, i.e., vehicle speed, road grade, and traction power is the same as FIGS. 3A-3C. The probability that the vehicle takes to Route 1 versus 2 are $p_1$ and $p_2$, respectively. The proposed S-MPC framework is applied as the solution for thermal management with the parameter settings being the same as the deterministic MPC presented above.

In this disclosure, assume that the probability of the vehicle taking each route is known, e.g., from the previously collected historical data. The probabilities of the two routes will influence the optimal results of S-MPC. FIGS. 6A-6F present the state trajectory results of S-MPC with different probabilities.

The probabilities of the two routes ($p_1$ and $p_2$) are predicted before the vehicle passes the intersection. Once the vehicle passes the intersection and the actual route is selected, the predicted probabilities are updated. In the scenario considered, the SMPC becomes a deterministic MPC once the vehicle passes the intersection and the current route becomes known.

Figure 6A:
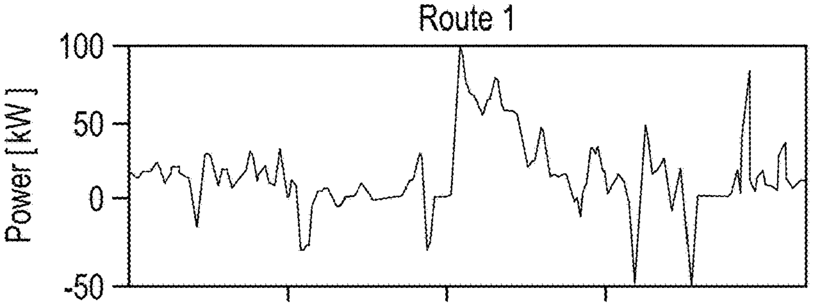
FIGS. 6A, 6C and 6E are graphs showing stochastic model predictive control results for traction power, battery temperature, battery cooling power, respectively, for route 1, with different probabilities assumed in the design.
Figure 6B:
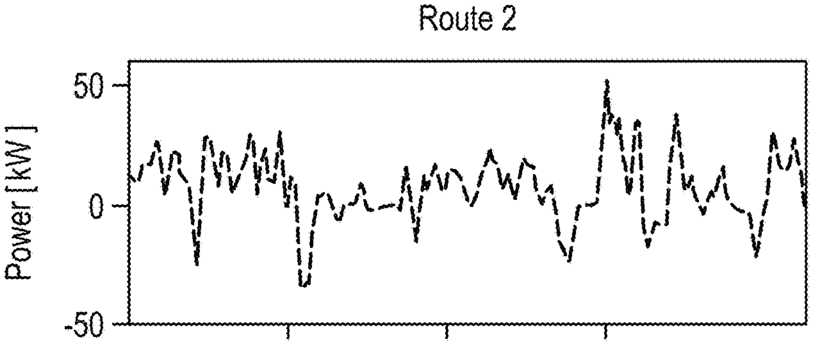
FIGS. 6B, 6D and 6F are graphs showing stochastic model predictive control results for traction power, battery temperature, battery cooling power, respectively, for route 2, with different probabilities assumed in the design.
Figure 6C:
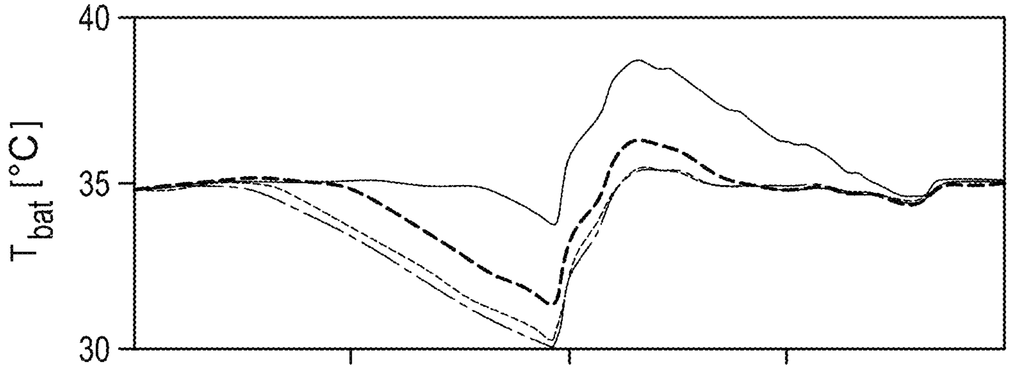
Figure 6D:
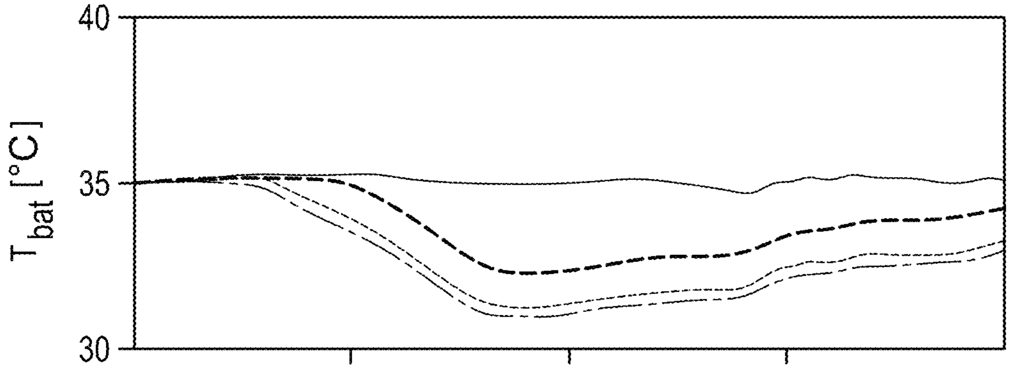
Figure 6E:
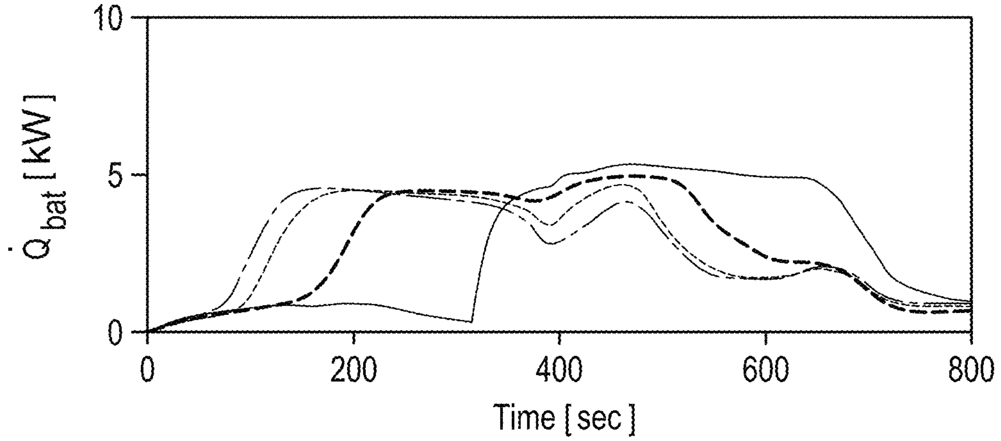
Figure 6F:
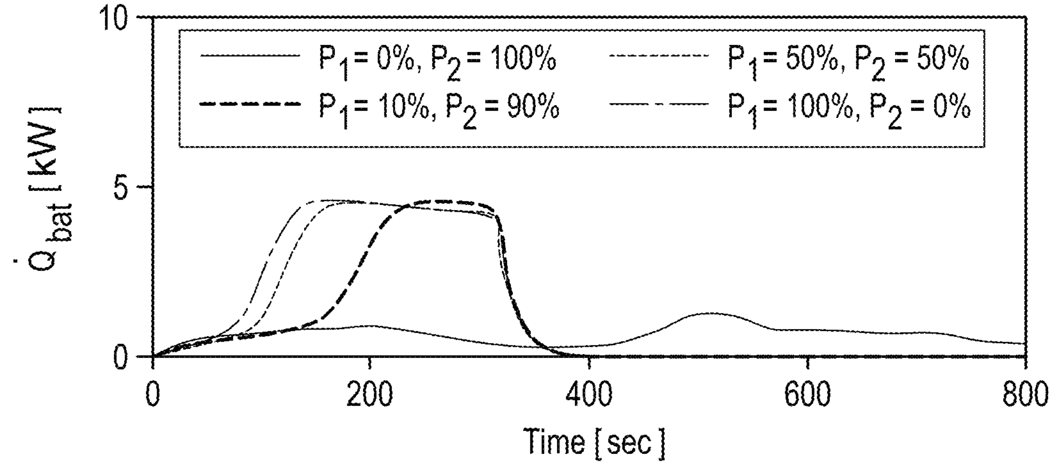

FIGS. 6A, 6C and 6E illustrate the simulation results of the vehicle actually going to Route 1 after the intersection, and FIGS. 6B, 6D and 6F shows the same results for Route 2. It can be seen that different probabilities result in varying battery cooling performance. Note that $p_1$=0% and $p_2$=100% indicate that the vehicle is predicted to take route 2 in certain. If, contrary to the prediction, the vehicle actually takes Route 1, as shown in FIG. 6C with the blue solid line, a significant constraint violation of battery temperature will be observed. As FIGS. 3A-3C demonstrate the need for precooling in Route 1 to prevent battery overheating, when in this case the wrong prediction prevents the controller from performing the pre-cooling to avoid the battery temperature constraint violation. Conversely, accurate prediction (with $p_1$=100% and $p_2$=0%) completely avoids constraint violations, as shown by the purple dashed line in FIG. 6C. For intermediate cases, where $p_1$ falls between 0% and 100%, the increased probability of taking Route 1 prompts the controller to conduct more pre-cooling, minimizing the cost in (14) and reducing constraint violation.

FIGS. 6B, 6D and 6F present the simulation results of the vehicle taking Route 2. It can be seen that no constraint violation occurs for all cases. However, when $p_2$=0%, indicating an incorrect prediction of taking Route 2, overcooling of the battery temperature can be observed, leading to extra energy consumed for battery cooling.

Figure 7A:
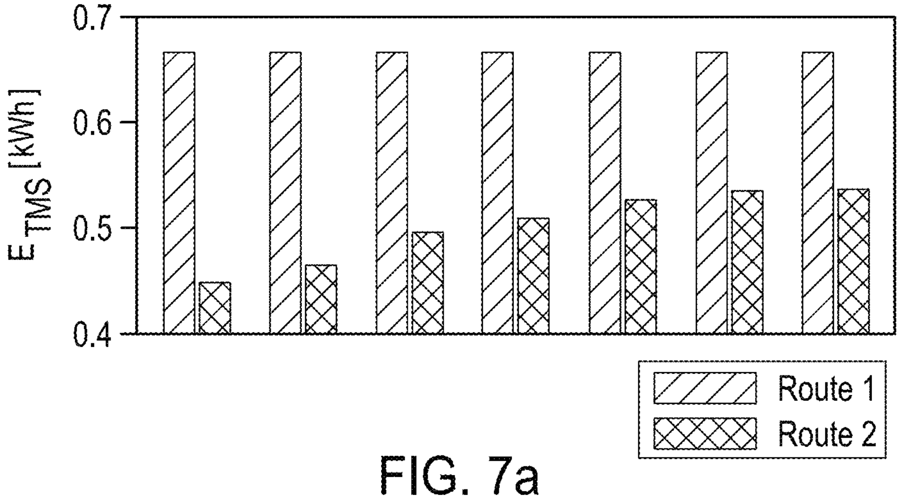
FIGS. 7A and 7B are graphs showing simulation results with different probabilities for energy consumption and accumulated battery constraint violations, respectively.
Figure 7B:
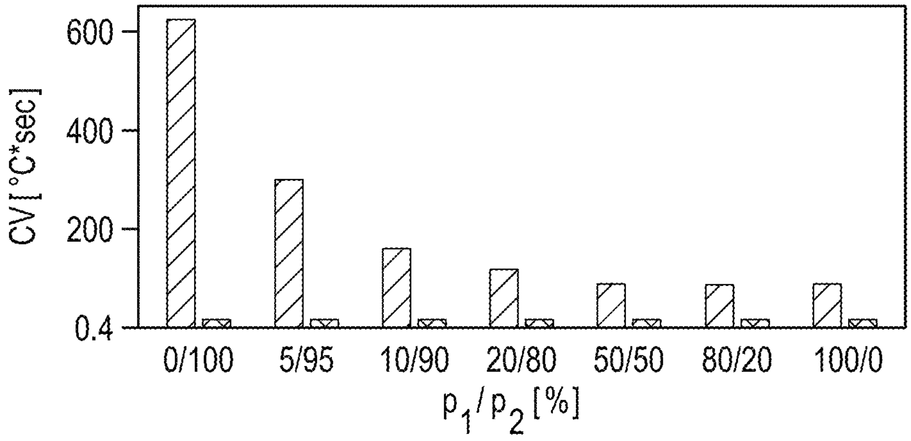

FIGS. 7A and 7B summarize the simulation results of the vehicle taking Route 1 or Route 2 with different probabilities, where $E_{TMS}$ is the total energy consumption for TMS, and CV is the accumulated battery constraint violation, which is defined as follows:

$$CV = \begin{cases} 0, & \text{if } T_{bat} \le T_{bat,max}, \\ T_{bat} - T_{bat,max}, & \text{if } T_{bat} \ge T_{bat,max}, \end{cases} \tag{16}$$

For Route 1, it can be seen that the probability has a marginal impact on the energy consumption for thermal management, while constraint violation increases, as $p_1$ reduces. For the vehicle taking Route 2, while constraint violation is always zero, energy consumption for battery cooling increases for reduced $p_2$ due to the over-cooling.

To study the benefits of the proposed SMPC framework, one can compare S-MPC with deterministic MPC using a fleet of vehicles, for which the following cases are defined:

Case I: Deterministic MPC using Route 1 as the predicted route,

Case II: Deterministic MPC using Route 2 as the predicted route,

Case III: S-MPC considering both routes and their probability.

100 Vehicles under the same condition are considered, and their total energy consumption ($E_{total}$) and constraint violation ($CV_{total}$) of three cases are presented in Table I below. Note that the same condition means all the vehicles have the same probabilities of taking each route and the same vehicle speed profile in each route. Note that the total energy consumption and constraint violation are calculated using the following equations:

$$E_{total} = E_1 \times p_1 \times 100 + E_2 \times p_2 \times 100 \tag{17}$$

$$CV_{total} = CV_1 \times p_1 \times 100 + CV_2 \times p_2 \times 100 \tag{18}$$

where $E_1$ and $E_2$ are the energy consumption of a single vehicle taking Route 1 and Route 2, respectively. Similarly, $CV_1$ and $CV_2$ denote the constraint violation of a single vehicle on Route 1 and Route 2, respectively. The probabilities used in (17) and (18) takes value in the fraction 0-1.

It is assumed that all the vehicles on the same route have the same speed profiles. In other words, comparing the fleet data's performance is equivalent to evaluating the expectations of a single vehicle. For example, $p_1$=20% indicates that 20 vehicles will actually go to Route 1 and the rest 80 vehicles to Route 2. The vehicle speed profiles of the two routes are the same as presented in FIG. 3A.

TABLE 1

THE TOTAL ENERGY CONSUMPTION AND CONSTRAINT VIOLATION RESULTS OF 100 VEHICLES UNDER THE SAME CONDITION.

| $p_1$ [%] | Case I | Case II | Case III (Ref) | Case III (with adaptation) |
|---|---|---|---|---|
| | Total Energy Consumption [kWh] | | | |
| 5 | 54.38 (+13.9%) | 47.45 (−0.02%) | 47.714 | 47.50 (−0.43%) |
| 10 | 55.15 (+7.12%) | 48.58 (−0.29%) | 51.49 | 51.77 (+0.56%) |
| 20 | 56.70 (+3.95%) | 50.86 (−0.32%) | 54.55 | 54.68 (+0.25%) |
| 50 | 61.33 (+0.69%) | 57.68 (−0.24%) | 60.91 | 60.88 (−0.05%) |
| 80 | 65.96 (+0.04%) | 64.51 (−0.07%) | 65.94 | 65.99 (+0.08%) |
| | Total Constraint Violation [oC · sec] | | | |
| 5 | 122 (−89.71%) | 2837 (+139.21%) | 1186 | 883 (−25.6%) |
| 10 | 244 (−75.22%) | 5674 (+476.16%) | 984 | 847 (−14.0%) |
| 20 | 488 (−57.71%) | 11348 (+883.36%) | 1154 | 1002 (−13.2%) |
| 50 | 1220 (−10.95%) | 28370 (+1970.8%) | 1370 | 1210 (−11.6%) |
| 80 | 1952 (−2.01%) | 45392 (+2178.71%) | 1992 | 1582 (−20.1%) |

Table I reveals that in comparison to Case III, Case I exhibits higher energy consumption for thermal management. This is primarily due to Case I always considering Route 1 information as the preview. As depicted in FIG. 7B, for vehicles on Route 2, their energy consumption increases significantly if Route 1 is predicted as the future route ($p_2$=0%). Conversely, Case II and Case III demonstrate similar energy consumption because the prediction has minimal impact on the energy consumption of vehicles over Route 1, as shown in FIG. 7A. However, the incorrect prediction significantly affects Case II in terms of constraint violations. Table I illustrates that Case II leads to more severe constraint violations compared to Case III, primarily due to errors in route prediction. This can be further understood by referring to FIG. 6C, where it is evident that when $p_2$=100%, notable constraint violations occur when there is insufficient pre-cooling. Moreover, the constraint violation of Case I is less than Case III.

In summary, there exists a trade-off between energy consumption reduction and constraint enforcement. When comparing it to deterministic MPC, S-MPC offers a well-balanced performance, effectively preventing severe constraint violations such as Case II, while also enhancing energy efficiency compared to Case I.

The performance of the proposed S-MPC was presented and compared with deterministic MPC. However, a question remains regarding the determination of penalty weights in the cost function to ensure a well-balanced performance of S-MPC. In all previous results, the penalty weights, denoted by $b_1$ and $b_2$, were set to sufficiently large values ($b_1$=$b_2$=5×$10^4$) to prevent significant oscillations in $\dot{m}_{com}$ and r. Additionally, the weights $a_1$ and $a_2$ were set to adequately high values ($a_1$=1×$10^6$, and $a_2$=1×$10^3$) to ensure effective constraint enforcement and minimize constraint violations.

Figure 8:
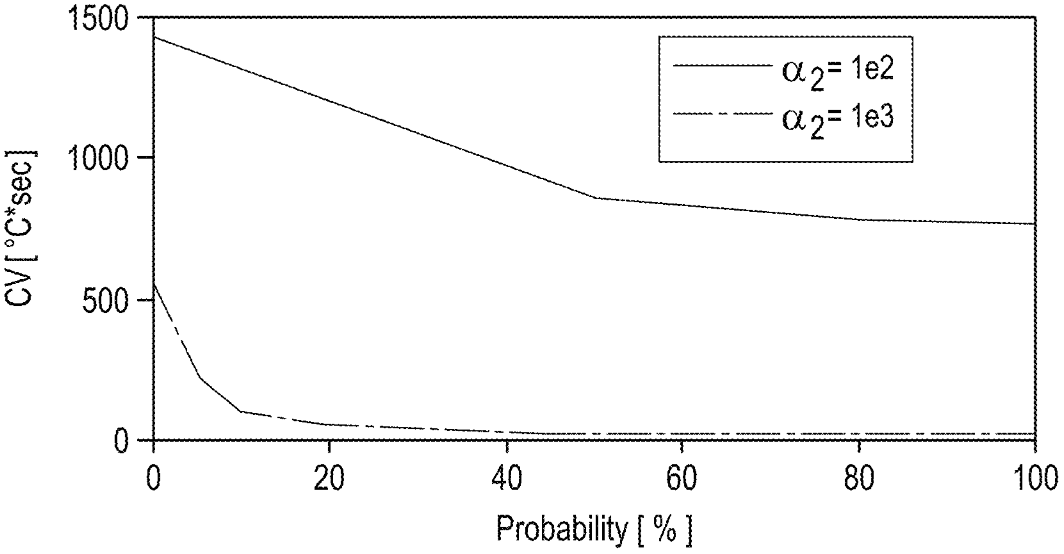
FIG. 8 is a graph showing constraint violation results of the vehicle on route 1 with different values of alpha.

FIG. 8 illustrates the constraint violation of the vehicle on Route 1 with different values of $a_2$. It can be seen that when the value of $a_2$ is relaxed from 1×$10^3$ to 1×$10^2$, the constraint violation becomes more significant, indicating that the soft constraint of battery temperature is not strict enough. This example shows that an offline sensitivity analysis is needed to determine the values of penalty weight and meet the requirement of constraint enforcement.

Alternatively, an adaptation strategy can be applied to adjust the penalty weight values based on the optimization results over the prediction horizon. By focusing on $a_2$, as an example to illustrate how an adaptation law can be employed. An algorithm to accomplish this goal is summarized in Algorithm 1.

Algorithm 1 Weight Adaptation based on the Estimated Stochastic Constraint violation 1: An initial value of $a_2$ is selected from $1 \times 10^2 - 1 \times 10^3$, at t = 0 sec;
2: for each time step;
3: Solve optimization problem (14) using the current $a_2(t)$;
4: Stochastic constraint violation ($CV_{stoc}(t)$) is calculated as $p_1(t) \times CV_1(t) + p_2(t) \times CV_2(t)$;
5: Update $a_2$: $a_2(t + \Delta t) = a_2(t) + \lambda(CV_{stoc}(t) - CV_{targ})$.
6: end λ in Algorithm 1 is the adaptation rate. For this study, it is selected as 2.5. Additionally, $CV_1$ and $CV_2$ are the predicted constraint violations over two routes based on the solution of (14). Therefore, the physical meaning of the stochastic constraint violation is the expectation of the constraint violation of all possible routes over the prediction horizon.

Figure 9A:
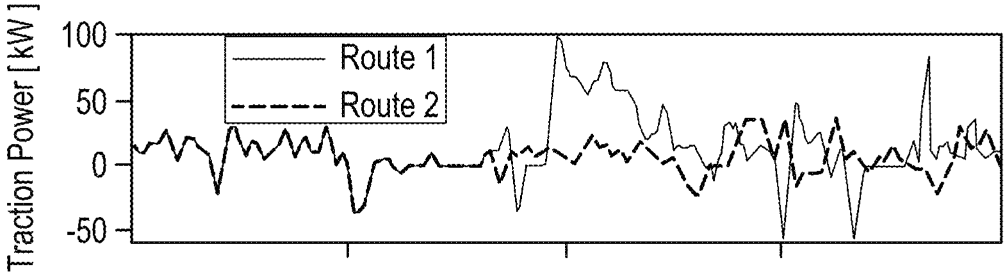
FIGS. 9A-9D are graphs showing simulation results for traction power, battery temperature, alpha and predicted stochastic constraint violations, respectively, where the vehicle is on route 1 and the initial $p_1$ is ten percent.
Figure 9B:
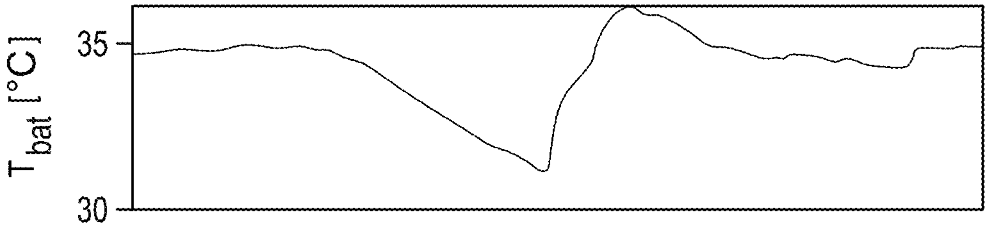
Figure 9C:
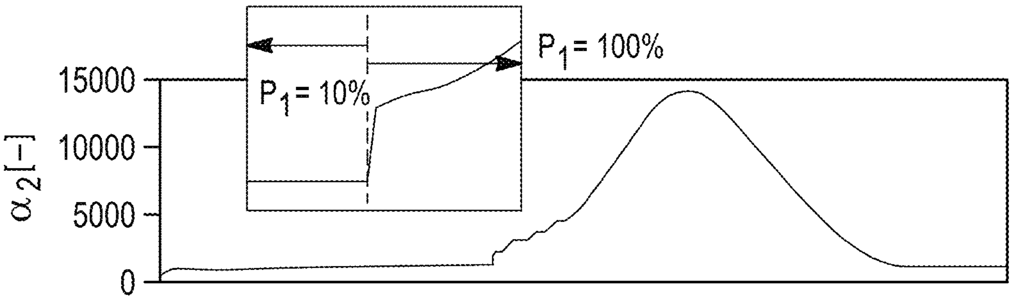
Figure 9D:
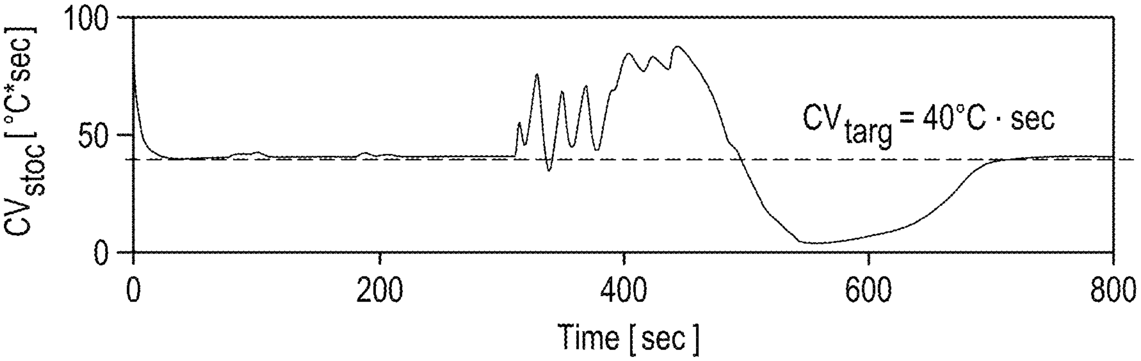

Note that the probabilities $p_1$ and $p_2$ change with the traveling time. $CV_{targ}$ is the target constraint violation, which is set as $CV_{targ}$=40° C.·sec in this study. Since the prediction horizon is 400 sec, $CV_{targ}$=40° C. see represents an average constraint violation of 0.1° C. over the prediction horizon. FIGS. 9A-9D illustrate the state trajectories resulting from the application of the adaptation strategy. As shown in FIG. 9C, the penalty weight $a_2$ is updated based on the predicted stochastic constraint violation. In this particular case study, the initial value of $a_2$ was set to 500, which proved to be insufficient. Consequently, the initial value of $CV_{stoc}$ exceeds the target value, prompting an increase in $a_2$ to approximately $1\times10^3$, thereby reducing $CV_{stoc}$ to 40° C.·sec. Upon passing the intersection, the vehicle acquires knowledge of the actual route, resulting in a change of $p_1$ from 10% to 100%. This change causes an increase in the predicted value of $CV_{stoc}$. As a result, $a_2$ experiences a significant increment after the vehicle passes the intersection.

A summary of the energy consumption and constraint violation results obtained by applying the adaptation strategy to the same fleet of vehicles is also presented in Table I as Case III (with adaptation). The results reveal that the energy consumption of Case III with and without adaptation is similar, with a marginal difference of less than 1%. Furthermore, the adaptation strategy leads to a remarkable reduction of up to 20% in total constraint violations.

In summary, the adaptation strategy effectively adjusts penalty weights based on predicted constraint violations, offering the advantage of eliminating the need for offline trials to calibrate these weights. Furthermore, this proposed strategy achieves a reduction in constraint violations with minimal impact on energy consumption.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling thermal management for electric vehicles powered in part by batteries, comprising:
- defining a cost function indicative of energy consumption by a thermal management system of a vehicle, such that the energy consumption is a function of a route taken by the vehicle, wherein the cost function accounts for multiple routes that the vehicle can take and includes at least one input variable correlated to an input of the thermal management system;
- receiving, by a computer processor, a list of potential routes for the vehicle;
- calculating, by the computer processor, a thermal management cost for traversing the list of potential routes using the cost function, thereby determining a value for the at least one input variable; and
- controlling the thermal management system in accordance with the value for the at least one variable.

2. The method of claim 1 wherein the cost function includes a first cost variable for energy consumption for thermal management of a passenger compartment of the vehicle, a second cost variable for energy consumption for cooling the batteries of the vehicle, an upper bound for temperature of the passenger compartment, and an upper bound for temperature of the batteries.

3. The method of claim 2 further comprises adapting penalty weights for slack variables in the cost function based on predicted constraint violations.

4. The method of claim 3 wherein the cost function further includes a first slack variable for the upper bound for temperature of the passenger compartment and a second slack variable for the upper bound for temperature of the batteries.

5. The method of claim 1 further comprises calculating the thermal management cost by minimizing the cost function using dynamic programming.

6. The method of claim 1 further comprises determining a probability the vehicle will take each route in the list of potential routes, where the cost function includes the probability the vehicle will take a given route.

7. The method of claim 6 further comprises determining a probability the vehicle will take a particular route based on historical data.

8. The method of claim 1 wherein controlling the thermal management system includes controlling an actuator in the thermal management system in accordance with the value for the at least one variable.

9. The method of claim 1 wherein controlling the thermal management system includes controlling a valve in a cooling subsystem, where the valve controls the split of quantity of coolant flowing into a battery cooling loop and a cabin cooling loop.

10. The method of claim 9 wherein the at least one input variable is further defined as one of a split ratio of coolant between the battery control loop and the cabin cooling loop, or a flow rate for a pump in the refrigerant system.

11. A method for controlling thermal management for electric vehicles powered in part by batteries, comprising:

defining a cost function indicative of energy consumption by a thermal management system of a vehicle, such that the energy consumption is a function of a route taken by the vehicle, wherein the cost function accounts for multiple routes that the vehicle can take and includes slack variables and at least one input variable correlated to an input of the thermal management system;

receiving, by a computer processor, a list of potential routes for the vehicle;

adapting, by the computer processor, penalty weights for slack variables in the cost function based on predicted constraint violations;

calculating, by the computer processor, a thermal management cost by minimizing the cost function using dynamic programming, thereby determining a value for the at least one input variable; and controlling the thermal management system in accordance with the value for the at least one variable.

12. The method of claim 11 wherein the cost function includes a first cost variable for energy consumption for thermal management of a passenger compartment of the vehicle, a second cost variable for energy consumption for cooling the batteries of the vehicle, an upper bound for temperature of the passenger compartment, and an upper bound for temperature of the batteries.

13. The method of claim 12 wherein the cost function further includes a first slack variable for the upper bound for temperature of the passenger compartment and a second slack variable for the upper bound for temperature of the batteries.

14. The method of claim 11 further comprises determining a probability the vehicle will take each route in the list of potential routes, where the cost function includes the probability the vehicle will take a given route.

15. The method of claim 14 further comprises determining a probability the vehicle will take a particular route based on historical data.

16. The method of claim 11 wherein controlling the thermal management system includes controlling an actuator in the thermal management system in accordance with the value for the at least one variable.

17. The method of claim 11 wherein controlling the thermal management system includes controlling a valve in a cooling subsystem, where the valve controls quantity of coolant flowing into a battery cooling loop and a cabin cooling loop.

18. The method of claim 17 wherein the at least one input variable is further defined as one of a split ratio of coolant between the battery cooling loop and the cabin cooling loop, or a flow rate for a pump in the refrigerant system.

19. A thermal management system for an electric vehicle powered in part by batteries, comprising:

a cooling subsystem including a battery cooling loop and a cabin cooling loop;

a pump configured to pump refrigerant through the cooling subsystem;

a value fluidly coupled between an outlet of the pump and the battery cooling loop and the cabin cooling loop, such that the valve controls amount of refrigerant flowing into the battery cooling loop and the cabin cooling loop;

a data store storing a cost function indicative of energy consumption by the thermal management system, such that the energy consumption is a function of a route taken by the vehicle, wherein the cost function accounts for multiple routes that the vehicle can take and includes at least one input variable correlated to an input of the thermal management system; and a controller interfaced with at least one of the pump and the valve, the controller configured to receive a list of potential routes for the vehicle and calculate a thermal management cost by minimizing the cost function, thereby determining a value for the at least one input variable.

* * * * *